United States Patent [19]
Plamper et al.

[11] Patent Number: 5,447,021
[45] Date of Patent: Sep. 5, 1995

[54] SNAP ON MOWER TRAIL SHIELD

[75] Inventors: Gerhard Plamper, Valley City; Daniel Martens, Brooklyn, both of Ohio

[73] Assignee: MTD Products Inc., Cleveland, Ohio

[21] Appl. No.: 130,238

[22] Filed: Oct. 1, 1993

[51] Int. Cl.6 .............................................. A01D 75/20
[52] U.S. Cl. .................................. 56/17.4; 56/320.1; 56/DIG. 24
[58] Field of Search ............ 56/17.4, 320.1, DIG. 24; 403/361; 16/225

[56] References Cited

U.S. PATENT DOCUMENTS

| | | | |
|---|---|---|---|
| 3,190,061 | 6/1965 | Gilbertson | 56/17.4 X |
| 3,432,183 | 3/1969 | Groll | 56/320.1 X |
| 4,030,277 | 6/1977 | Christopherson | 56/320.1 |
| 5,181,371 | 1/1993 | DeWorth | 56/320.1 X |

Primary Examiner—Terry Lee Melius
Attorney, Agent, or Firm—Lightbody Law Office

[57] ABSTRACT

A trail shield for a lawn mower is disclosed having a snap on head section with the body extending symmetrically off the center line thereof.

23 Claims, 2 Drawing Sheets

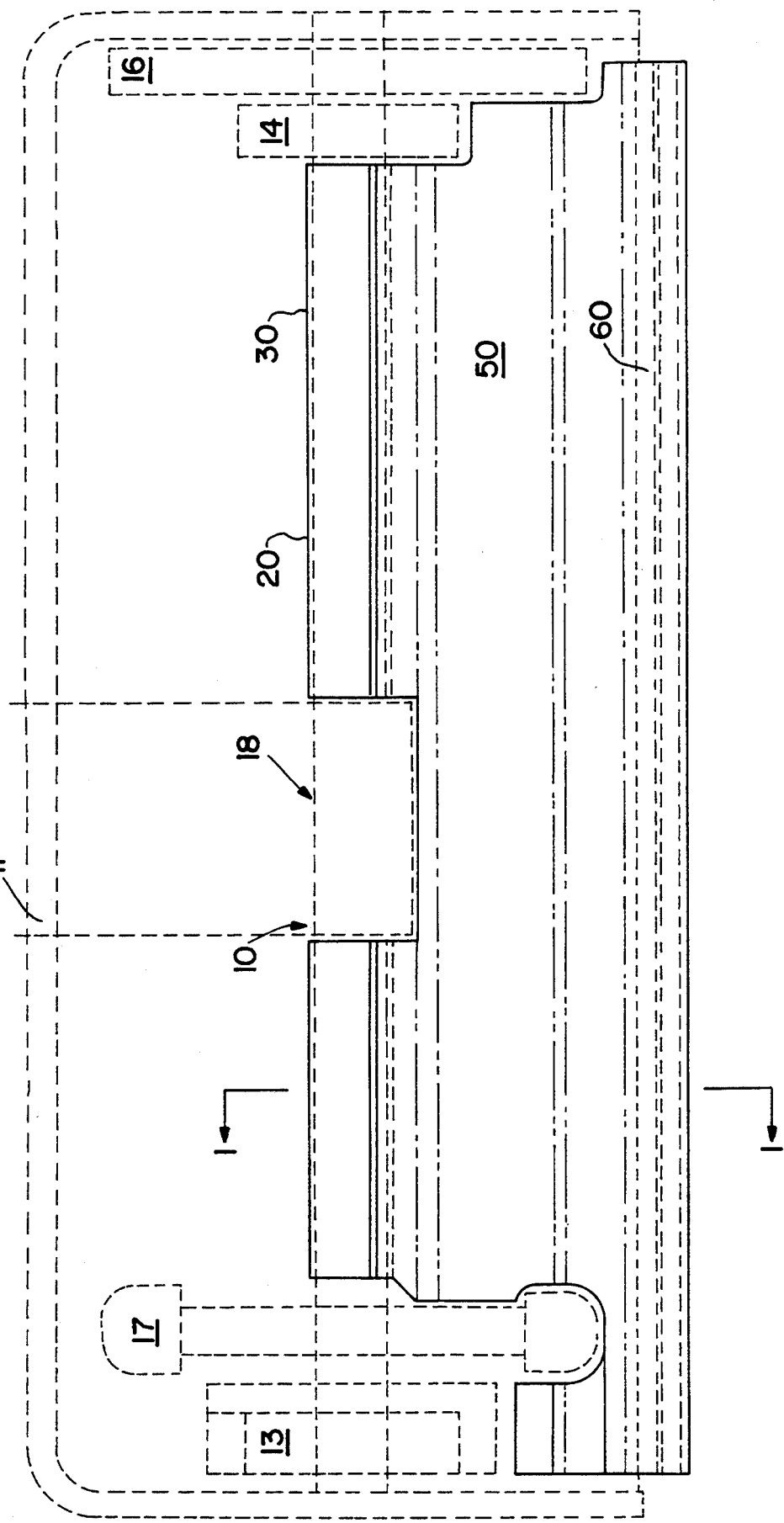

SNAP ON MOWER TRAIL SHIELD

FIELD OF THE INVENTION

This invention relates to a way of mounting a trail shield to a lawn and garden mower and, more particularly, to rear discharge walk behind lawn mowers.

BACKGROUND OF THE INVENTION

Lawn and garden mowers typically have trail shield along the rear sections of a mowing deck for usage therewith. Methods of mounting these trail shields to the mower deck include trapping the upper edge of the trail shield between a fixed steel bar and the mower deck for fixed connection thereto, the use of trailing brackets bolted to the mower deck capturing the upper edge of the trailing shield, molding a wire rod into the upper edge of the trail shield and then pivotally mounting the wire rod to the mower deck (normally through an auxiliary flange), and using a number of "O" shaped pieces passed around the rear axle, such pieces having a lower end which is bolted to a separate trail shield. Typically in these units, the upper edge of the trail shield is fixedly attached to an intermediate part, which intermediate part is then connected to the rear edge of the mower deck. U.S. Pat. No. 5,181,371 is representative of a trail shield.

OBJECTS AND SUMMARY OF THE INVENTION

It is an object of the present invention to provide for a stronger trail shield.

It is another object of the present invention to simplify the construction of a lawn mower including a trail shield.

It is yet another object of the present invention to strengthen the interconnection between the trail shield and the mower deck.

It is still another object of the present invention to utilize the rear axle of the lawn mower to interconnect a trail shield to a mower deck.

It is a further object of this present invention to utilize a full length pivoting connection between the trail shield and the mower deck.

It is still a further object of this present invention to strengthen the interconnection between the upper edge of the trail shield and the mower deck.

Other objects and a more complete understanding of the present invention may be had by referring to the drawings.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIG. 3 is a rear view of a trail shield for a walk behind lawn mower incorporating the invention of the application.

DETAILED DESCRIPTION OF THE INVENTION

Figure 1:
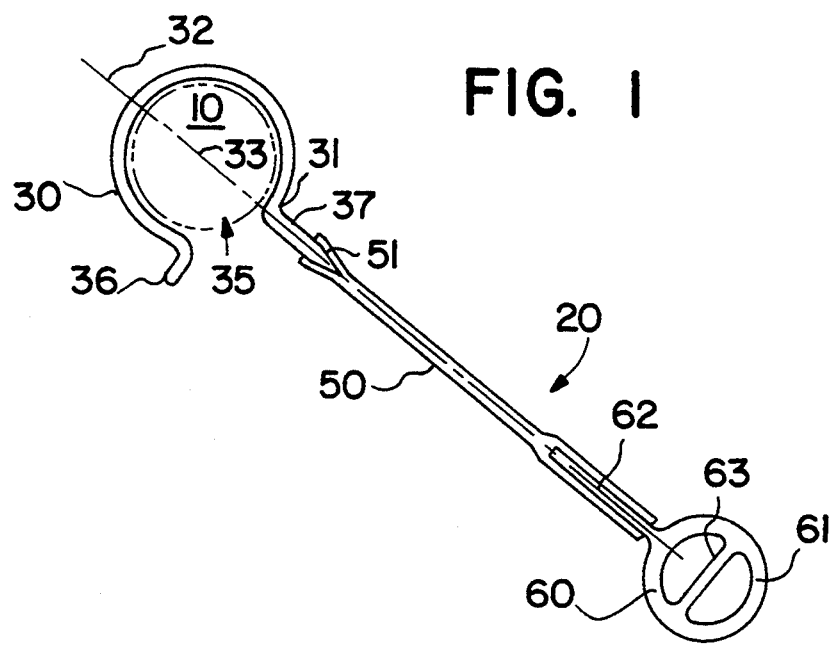
FIG. 1 is a side view, in cross section, of the trail shield of FIG. 3 taken substantially along lines 1—1 therein.

The trail shield of this invention is designed for use with a lawn mower having a rod, axle, or tube 10 somehow connected near the rear of a mower deck 11. A typical lawn mower is a rear drive lawn mower such as the MTD Model 480. This model is a single rotary blade, gas engine powered, walk behind lawn mower having a power driven rear axle. The rear axle itself extends full length across the width of the mower deck mounted thereto through two pivoting swing members 13, 14. The swing members 13, 14 are steel links approximately four inches in length having their front sections pivotally mounted to the mower deck 11 about a swing point with the axle 10 rotatively connected to their trailing ends via bearing means. A selectable locking height adjustment arm (not shown) controls the angular pivoting of the swing members 13 and 14 in respect to the mower deck 11 thus moving the rotating axle 10 upwards and downwards to adjust the height of cut for the lawn mower. This particular lawn mower is utilized by way of example and one skilled in the art would readily realize that the invention could be adapted for use with other units including those having fixed non-rotating rear axles, non-driven rear axles, differing height rear axles, separate tubular pivot rods, or otherwise as appropriate for the particular application.

The invention of this application relates to an improved trail shield 20. This improved trail shield includes an attachment section 30, an intermediate flex section 50, and a trailing portion 60.

The attachment section 30 is designed for snap over interconnection with a rod, axle, or tube member, with the added provision that any forces on the trail shield is passed to approximately the middle point the attachment section 30. This latter is accomplished by having the intersection 31 between the head section 37 (for connection to the intermediate flex section 50) and the attachment section 30 occurring substantially congruent with a line 32 drawn through the contact point of the intermediate flex section 50 and the use through the axial center 33 of the attachment section 30. With this design, any pulling separation force on the trail shield 20 will be passed to the attachment section 30 directly in line with the central axis of the attachment section 30. This optimizes the retention strength for the attachment section 30 in respect to the axle rod or tube, in this instance the axle 10. Note that the rod or tube 10 could have a non-circular cross section.

The snap over feature of the trail shield 20 is provided by having an opening 35 in the attachment section 30. The width of the opening 35 is designed to be less than the diameter of the rod, axle, or tube so as to provide a snap over interconnection with the rod or tubing to be utilized therewith. Preferably, this opening 35 is located immediately adjacent to the intersection 31 so as to optimize the amount of force that the attachment section 30 can withstand before ultimate separation from the rod, axle, or tube. Preferably, also, the inside diameter of the attachment section 30 is sized so as to allow this section, once installed, to pivot freely about the tube or rod 10. No screws, bolts, fittings, or clamps are necessary to install the shield. Once installed, however, tools such as a screwdriver or knife are necessary to effect removal. The reason for this is the comparatively smaller area for the application of a removal force versus the area for the application of an installation force.

In the preferred embodiment disclosed, the axle 10 has a diameter of approximately 0.875". For this dimension, the width of the opening in the preferred embodiment is substantially 0.500".

A small outwardly extending flange 36 immediately adjacent to the opening 35 is preferable included. This flange 36 facilitates the installation of the shield 20 by providing for an inclined lead in edge for the opening 35 (in combination with other inclined lead in edge on the other side of the opening, in this instance the flex section 50). The angle of this flange 36 in respect to the opening 35 is preferably the same as the angle at the other side of the opening between the head section 37 and the attachment section 30. This symmetry would provide for an equalization of the forces on each side of the opening 35, thus facilitating installation. In the preferred embodiment disclosed, this angle is substantially 45°. The particular flange 36 disclosed extends substantially 0.21" outwardly from the main body of the attachment section 30. The head section 37 extends further.

The particular attachment section 30 disclosed is formed of rigid PVC having a Geon 8700A-296A, Durometer 82 Shore D Min. The attachment section itself is approximately 0.94" inner diameter having a wall thickness of 0.075" except at the head section 37 wherein the thickness increases to 0.100". This thickened head section insures there will be a minimum of flexing at the intersection 31. This facilitates the passing of force between the head section 37 and the rest of the attachment section 30.

The intermediate flex section 50 interconnects the attachment section 30 with the trailing section 60. The particular intermediate section 50 disclosed is flexible. This flexing helps to reduce the non-linear sideward forces which may be placed on the trailing section 60 due, for example, to uneven ground terrain.

The particular intermediate section 50 disclosed has a top end 51 which is bonded to the head section 37 of the attachment section 30 and a bottom end 52 which is bonded to the later described trailing section 60. This bonding preferably occurs through the use of simultaneous extrusion in a die having three adjacent plastic streams. This facilitates the manufacture of the trail shield 20 as well as strengthening the joints relative to other bonding methods.

The overall length of the preferred intermediate section 50 between the lower most point of the attachment section 30 and the upper most point of the trailing section 60 is approximately 1.74". This section is approximately 0.09" in width. It is constructed of vinylex compound Geon 83718 flexible PVC or equivalent.

The trailing section 60 is designed to contact the ground at the trailing section of the mower deck. The particular trailing section 60 disclosed is a circular member 61 having an upwardly extending flange 62 and a reinforcing intermediate member 63. As previously discussed, the circular body member 61 is designed to trail along the ground at the aft section of the lawn mower. For this reason, a circular cross section is preferred. The upwardly extending flange 62 is designed for interconnection with the intermediate flex section 50. Due to the fact that the ground stresses will be slightly higher at the lower end of the trail shield, and due to the desirability of having the lower end continually meet the ground at an acute angle, the upwardly extending flange 62 extends for a significant distance from the round body member 61. In the particular embodiment disclosed, this extension is substantially 1.14" from the center line of the body member 61. This extension allows for an extended bond between the intermediate section 50 and the trailing section 60. This strengthens this critical connection. The internal member 63 is designed to strengthen the body member 61 against collapsing forces. This flange is thus preferably located at approximately 45° angle in respect to the plane of the ground (see for example FIG. 1 for an in use position).

In the particular embodiment disclosed, the trailing section 60 is made of the same rigid PVC as the attachment section 30. The body member 61 has a diameter of approximately 0.700" and a wall thickness of approximately 0.09". The internal member 63 has a wall section of approximately 0.06".

The trail shield 20 may be modified in lateral or other cross section so as to meet a particular application. For example, the particular trail shield 20 disclosed is designed to be utilized on a lawn mower having a chain rear wheel drive chain case 17 and a central transmission support 18. For this reason, cutouts are provided in the trail shield 20 to allow for these additional members. The combination of cutouts for the pivots 13, 14, the height adjustment lever 16, the drive chain case 17, and the support 18 produces a unique lateral cross section having particular cutouts for the given disclosed application (see FIG. 3). These cutouts are stamped in aggregate in the extrusion of the trail shield 20 during the process of cutting sections of trail shield off of a multiple length trail shield extrusion coming from the dies. This process allows one to utilize given dies for a multiplicity of applications merely by changing the subsequent stamping operation. Separately stamping operations could also be utilized. This post extrusion lateral cross section modifications allows one to accommodate a multiplicity of mowers having particular unique parameters and acceptable trail shield widths in an expeditious manner via a single extrusion die.

No matter what the embodiment, after manufacture of the individual trail shield, it is snapped over the tubing of the lawn mower by hand; this operation facilitated by the angles of the flange 36 and the head section 37 to the opening 35 plus the fact that the installer has access to the large circular diameter section of the attachment section 30 (i.e., a significant easily accessible area for the application of installation forces). Once installed, due to the fact that the attachment section 30 can swivel around the axle 10 in combination with the flexible properties of the intermediate section 50, the forces on the attachment section 30 are minimized, with any forces from the trailing section 60 passed to the center of the attachment section 30 where they can be efficiently absorbed. The trail shield 20 is thus strong and adaptable. The trail shield 20 is also difficult to remove without tools (i.e., only a minimum area is accessible for the application of removal forces).

Figure 2:
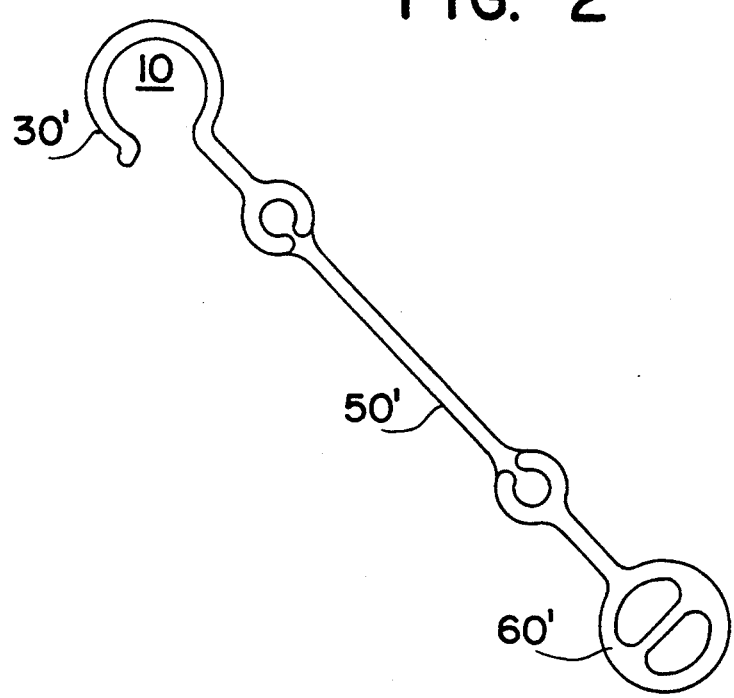
FIG. 2 is a modified version of the trail shield of FIG. 1.

Although the invention has been described in its preferred form in particular detail, it is to be understood that numerous changes can be made without deviating from the invention as hereinafter claimed. As an example of this, the applicant shows a modified trail shield adapted to be used on an axle smaller in diameter and without either pivoting or drive features (see FIG. 2). Further, the interconnection between the various sections 30', 50', and 60' is accomplished through a bead approximately 0.19" in diameter on either end of the sections 30 and 60 with corresponding diameter bead on the ends of the intermediate section 50'. This device is installed and operates in a manner similar to the first embodiment.

Therefore, while the invention has been described in combination with embodiments thereof, it is evident that many alternatives, modifications, and variations will be apparent to those skilled in the art in light of the foregoing description. Accordingly, it is intended to embrace all such alternatives, modifications and variations which fall within the spirit and scope of the appended claims.

I claim:

1. An improved trail shield for use with a mower deck having a tube having an outer diameter connected to the mower deck, the shield comprising a body having an attachment section and another section, said attachment section having a diameter and an opening, said diameter of said attachment section being greater than said diameter of said tube, said opening of said attachment section being smaller than the diameter of said tube, said another section being interconnected to said attachment section and said another section extending off of said attachment section radially outwards of the axial center of said attachment section.

2. The improved trail shield of claim 1 characterized in that said opening is located immediately adjacent to the interconnection between said attachment section and said another section.

3. The improved trail shield of claim 2 characterized in that said opening is approximately 40–60% of the diameter of said attachment section.

4. The improved trail shield of claim 2 characterized in that said attachment section has a flange, said flange being on the other side of said opening from the interconnection between said attachment section and said another section.

5. The improved trail shield of claim 4 characterized in that said flange contacts said attachment section at an angle, said head section interconnects with said attachment section at an angle, and said angle of said flange intersection is substantially the same as said angle of said head section intersection.

6. The improved trail shield of claim 1 characterized in that said another section is flexible.

7. The improved trail shield of claim 1 characterized in that said attachment section has a head section, said attachment section having a thickness, said head section has a thickness, and said thickness of said head section being greater than said thickness of said attachment section.

8. The improved trail shield of claim 1 wherein said trail shield is utilized with a device having a part about the tube and characterized by the addition of cutout, said cutout being in said trail shield and said cutout in said trail shield providing a clearance for the part about the tube.

9. The improved trail shield of claim 8 wherein there are a multiplicity of parts around the tube and characterized in that said trail shield has a multiplicity of cutouts to match said multiplicity of parts.

10. An improved trail shield for use with a mower deck having a tube having an outer diameter connected to the mower deck, the tube extending full length laterally across such mower deck, the shield comprising a body having an attachment section and a head section, said attachment section having a length and a diameter and an opening, said length of said attachment section being substantially equal to the length of the tube extending laterally across the mower deck, said diameter of said attachment section being greater than said diameter of the tube, said opening of said attachment section being smaller than the diameter of the tube, said head section being interconnected to said attachment section, said head section extending off of said attachment section radially outwards of the axial center of said attachment section, and said opening located adjacent to the interconnection between said attachment section and said head section.

11. The improved trail shield of claim 10 characterized in that said attachment section has a flange, said flange being on the other side of said opening from the interconnection between said attachment section and said head section.

12. The improved trail shield of claim 11 characterized in that said flange contacts said attachment section at an angle, said head section interconnects with said attachment section at an angle, and said angle of said flange intersection is substantially the same as said angle of said head section intersection.

13. The improved trail shield of claim 10 characterized in that the tube is a rear axle.

14. The improved trail shield of claim 13 characterized in that said rear axle rotates.

15. The improved trail shield of claim 14 characterized in that said rear axle is power driven.

16. The improved trail shield of claim 10 characterized in that said head section extends off of said attachment section substantially congruent to a line drawn through the contact point of said head section and the axial center of said attachment section.

17. The improved trail shield of claim 10 characterized in that said attachment section having an inside diameter and said inside diameter being larger than the diameter of the tube so as to allow said attachment section to pivot about the tube.

18. The improved trail shield of claim 17 characterized in that said attachment section has a flange, said flange being on the other side of said opening from the interconnection between said attachment section and said head section.

19. The improved trail shield of claim 18 characterized in that said flange contacts said attachment section at an angle, said head section interconnects with said attachment section at an angle, and said angle of said flange intersection is substantially the same as said angle of said head section intersection.

20. The improved trail shield of claim 10 characterized in that said attachment section has a thickness and said thickness being greater at the location of interconnection with said head section.

21. The improved trail shield of claim 10 characterized by the addition of a trailing section, means to connect said trailing section to said head section, and said trailing section having a circular cross section.

22. The improved trail shield of claim 21 characterized in that said trailing section is hollow and by the addition of said trailing section including a reinforcing member, said reinforcing member extending across said hollow of said trailing section.

23. The improved trail shield of claim 10 characterized by the addition of a trailing section, said trailing section including a body and an upwardly extending flange, said upwardly extending flange extending a significant distance from said body of said trailing section, an intermediate section, said intermediate section having two ends, one end of said intermediate section being bonded to said upwardly extending flange for an extended distance and said other end of said intermediate section being bonded to said head section.

* * * * *